UNITED STATES PATENT OFFICE.

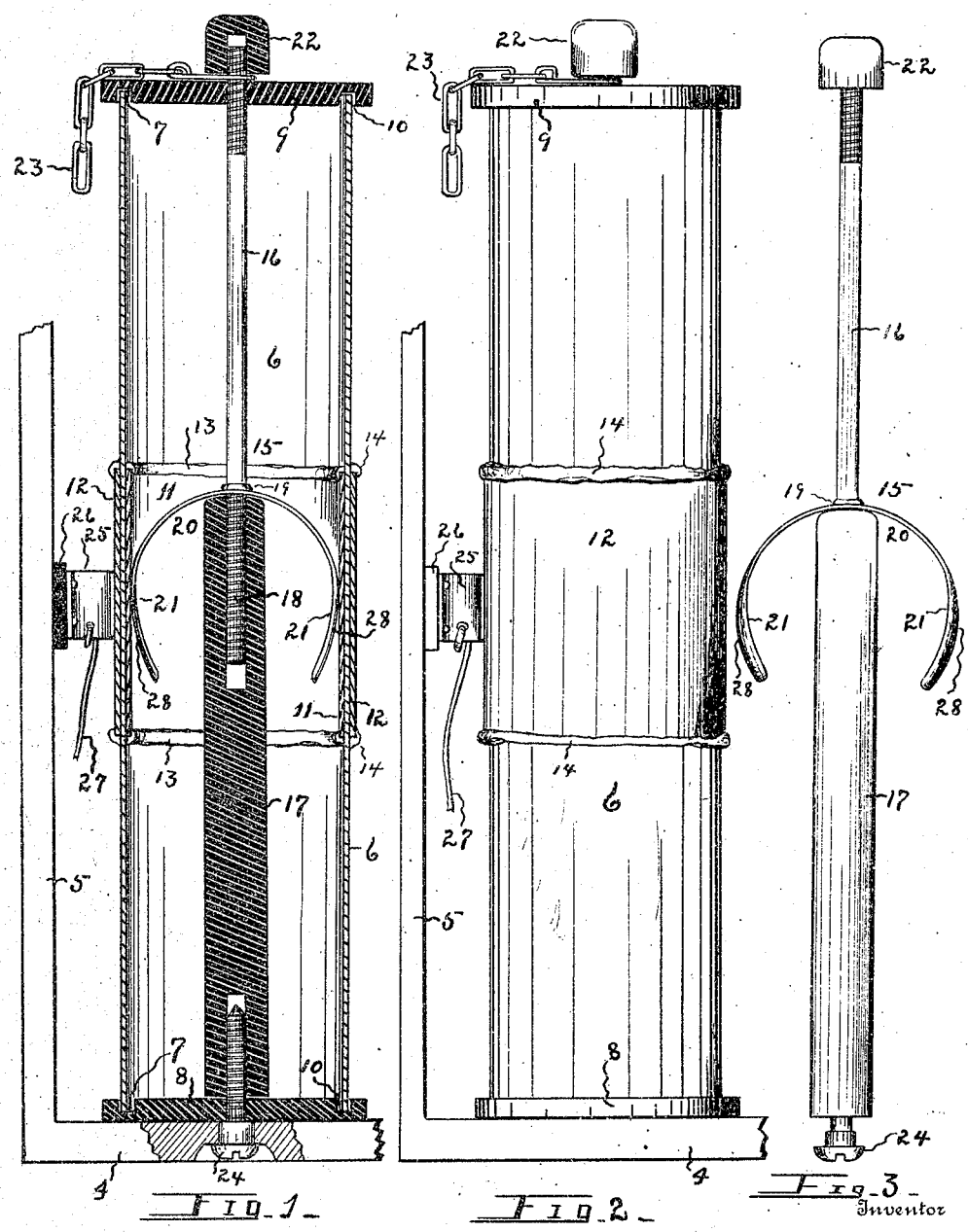

WILLIAM C. SHINN, OF LINCOLN, NEBRASKA.

ELECTRICAL CONDENSER.

No. 907,296.　　　Specification of Letters Patent.　　　Patented Dec. 22, 1908.

Application filed August 14, 1908. Serial No. 448,515.

*To all whom it may concern:*

Be it known that I, WILLIAM C. SHINN, a citizen of the United States, residing at Lincoln, in the county of Lancaster and State of Nebraska, have invented certain new and useful Improvements in Electrical Condensers, of which the following is a specification.

This invention relates to improvements in electrical condensers of the class adapted for use in connection with static electric machines.

The object of the invention is to provide a condenser composed of parts which will be efficient and reliable in operation for storage of electrical charges, and which may have a form to occupy a limited space within, and to conduce to a light weight structure for, a portable static electric machine.

The invention has reference to an electrical condenser of the class and for the purposes described, composed of separable parts, found to be economical in construction, and which may be conveniently assembled and mounted, or readily disassembled.

The invention consists of the novel construction and arrangement of parts as described herein, pointed out by the claims and as shown in the accompanying drawing, wherein,—

Figure 1 is a side view in longitudinal section of an electrical condenser embodying my invention, a broken away supporting wall of a static electric machine being added. Fig. 2 is a vertical side view of the condenser shown in Fig. 1. Fig. 3 is a detail relating to Figs. 1 and 2, showing the disk-compression standard, and normal curvature of contact-wings.

Referring now to the drawing for a more particular description, numerals 4 and 5 respectively indicate portions of the bottom and side of a machine frame or support. I provide an elongated tube or cylindrically-formed casing 6, constructed of glass, rubber or other insulating substance, and having open terminals 7. I provide the base 8 and cover 9; they are formed of insulating material and are substantially alike, preferably being formed as disks with annular grooves 10 formed in their inner sides to receive therein the terminals 7 of tube 6.

Midway between the terminals of tube 6 and upon opposite sides of its wall are respectively disposed the inner and outer armatures 11 and 12, formed as annular bands, the terminal edges of which are secured upon the surfaces of the tube as indicated, respectively, at 13 and 14 by non-conducting cement or any convenient non-conducting sealing substance.

As thus described tube 6 has a uniform diameter, and its armatures are disposed to occupy, comparatively, a limited area of the elongated tube. No sealing material is used for securing the terminals to the disks, this not being required since, by reason of the construction, these terminals are disposed at a considerable distance, comparatively speaking, from the armatures, and since the parts are separable, a convenience for mounting and cleaning is attained, as will be seen.

I provide the standard 15, comprising a metal rod 16 and a non-conducting stem 17. The lower end of rod 16 has a part 18 threaded within the upper end of stem 17. Rod 16 is provided with collar 19, and I employ a metal contact-member 20 which has a seating between this collar and the upper terminal of stem 17. Member 20 is preferably formed as a resilient band having outwardly extending arms or wings 21, with outer convexed surfaces 28, and by reason of the threaded connection described, the contact-member may be rigidly secured midway of its ends upon standard 15.

The upper end of rod 16 traverses the middle of disk 9, with which it has a threaded connection, and it has a threaded connection with non-conducting holding cap 22, seated outwardly of this disk.

Numeral 23 indicates a metal connector or chain, one end of which is held beneath cap 22 to a contact with rod 16, and the opposite end of this chain may communicate with any suitable source of electrical supply.

The lower end of stem 17 may have a seating upon the inner surface and at the middle of base 8.

As thus described, standard 15 is disposed longitudinally and centrally of the cylindrically-formed casing 6. I provide means for compressing the disks firmly upon the terminals of this casing, which will prevent damp air from entering, the same consisting of screw 24 and its mounting, together with other threaded connections shown. Screw 24 has a threaded connection with base 8 and with the lower end of stem 17, and traverses the bottom support 4, and the device may be secured to occupy a limited space adjacent the side wall 5. Any resilient, metallic band 25 may be employed, having a rigid seating upon non-conducting plate 26. Plate 26 is secured interiorly of wall 5, and by use of a metal strand 27, electrical communication of armature 12 may be made with the ground or with a switch.

The production of the herein described cylindrical casing is attended with very slight expense compared to the structure of the common Leyden jar with integral bottom, and a high degree of perfection may be attained in its manufacture since it has open ends and a uniform diameter. With the armatures disposed as mentioned, the elongated cylindrical form operates as an effective housing for storage of electrical charges, and by reason of the construction shown, the parts may be readily and conveniently separated or assembled.

The normal curvature of contact member 20 is shown in Fig. 3. When assembling or separating the parts, wings 21 may slide upon the inner surface of casing 6 and upon armature 11, the resilient wings being pressed inwardly, and therefore, a reliable metallic contact is made with the inner armature; and the wings, by reason of their curvature, will not cause abrasion of the tin foil.

It will be noted that the chamfered parts or grooves 10 formed in the disks afford a secure housing for the terminals of casing 6, the ends of the casing being seated within the grooves. By means of the threaded parts, the disks are pressed upon the terminals of the casing. The casing and other parts, therefore, may have rigid seatings, which conduce to prevent injury of any of the parts, for the portable uses mentioned.

Having fully described my invention, what I claim as new and desire to secure by Letters Patent is,—

1. In combination, an electrical condenser of the class described, comprising a non-conducting cylindrically-formed casing provided with inner and outer armatures midway of its terminals; a non-conducting base and non-conducting cover each having an annularly chamfered part; a standard longitudinally disposed within the casing and having a metallic part and a non-conducting part; resilient wings communicating with said inner armature and the metallic part of said standard; the terminals of said cylindrically-formed casing adapted to have seatings within the annularly chamfered parts of said base and cover; adjustable devices for causing a movement of said base and cover in directions toward each other for securing the base and cover inclosingly upon the terminals of said cylindrically-formed casing.

2. In combination, an electrical condenser of the class described, comprising a non-conducting cylindrically-formed casing provided with inner and outer armatures midway of its terminals; a non-conducting base and a non-conducting cover; a standard longitudinally disposed within the casing and having a metallic part and a non-conducting part; resilient wings communicating with said inner armature and the metallic part of said standard; the terminals of said cylindrically-formed casing adapted to have a seating upon said non-conducting base and non-conducting cover.

3. In combination, an electrical condenser, comprising a non-conducting tubular casing having an inner and an outer armature between its terminals and provided with a removable non-conducting base and cover; a standard within the tubular casing and having a metallic part traversing said cover and formed with a non-conducting part having a threaded connection with said base for causing a compression of the base and cover upon the terminals of said tubular casing; metallic arms upon and extended outwardly from the metallic part of said standard to communicate with said inner armature.

4. An electrical condenser comprising, in combination, a non-conducting cylindrical casing provided between its terminals with an inner and an outer armature and upon its ends with a removable non-conducting base and cover; a standard within the casing comprising a metallic part traversing said cover and a non-conducting part having a threaded connection with said base for causing a compression of the base and cover upon the ends of said casing; resiliently-formed metallic wings upon the metallic part of said standard and having outer convexed surfaces in communication with said inner armature.

5. In combination, an electrical condenser comprising a non-conducting base and a non-conducting cover, each having an annularly chamfered part; a non-conducting cylindrical casing provided with inner and outer armatures and adapted to have end-mountings within the annularly chamfered parts of said base and cover; a standard within the casing comprising a metallic part adjustably connected with and traversing the cover, and a non-conducting part having an adjustable connection with said base; a metallic member upon the metallic part of said standard, and extended to communicate with said inner armature.

6. An electrical condenser comprising, in combination, a non-conducting tubular casing provided with an inner and an outer armature and with a removable non-conducting base and cover; a standard within the casing consisting of a conducting part adjustably connected with and traversing the cover, and a non-conducting part having an adjustable connection with said base; an outwardly-extending metallic member upon the conducting part of said standard in communication with the inner armature of said casing.

In testimony whereof I have affixed my signature in presence of two witnesses.

WILLIAM C. SHINN.

Witnesses:
WILEY RAY YOUNG,
GEORGE CLARK THOMAS.